Oct. 13, 1925. 1,556,910
T. D. CABOT
ORIFICE OR SIMILAR GAS METER
Filed June 21, 1923 2 Sheets-Sheet 1
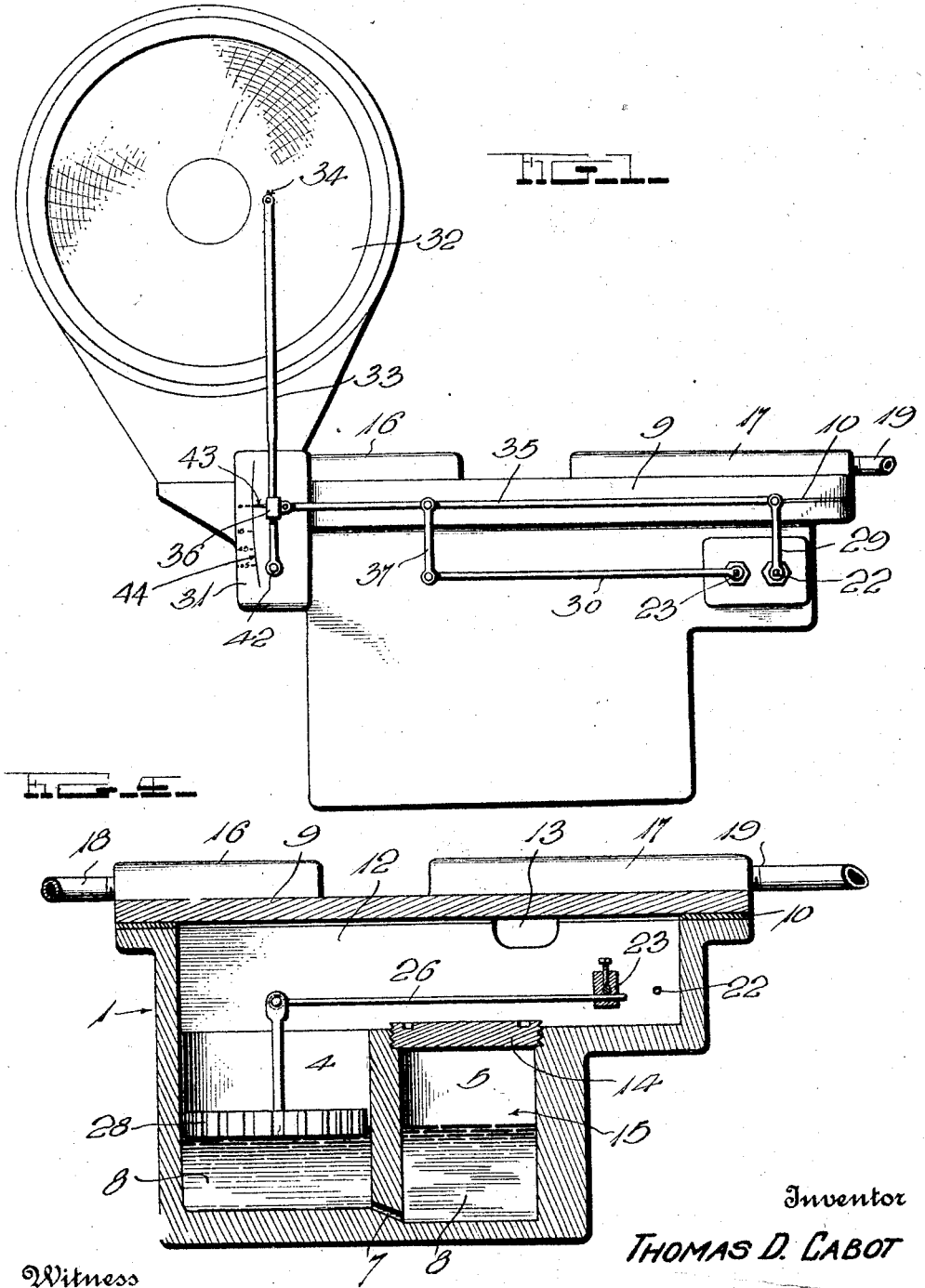
Witness
H. Woodard
Inventor
THOMAS D. CABOT
By H. R. Willson &co.
Attorneys

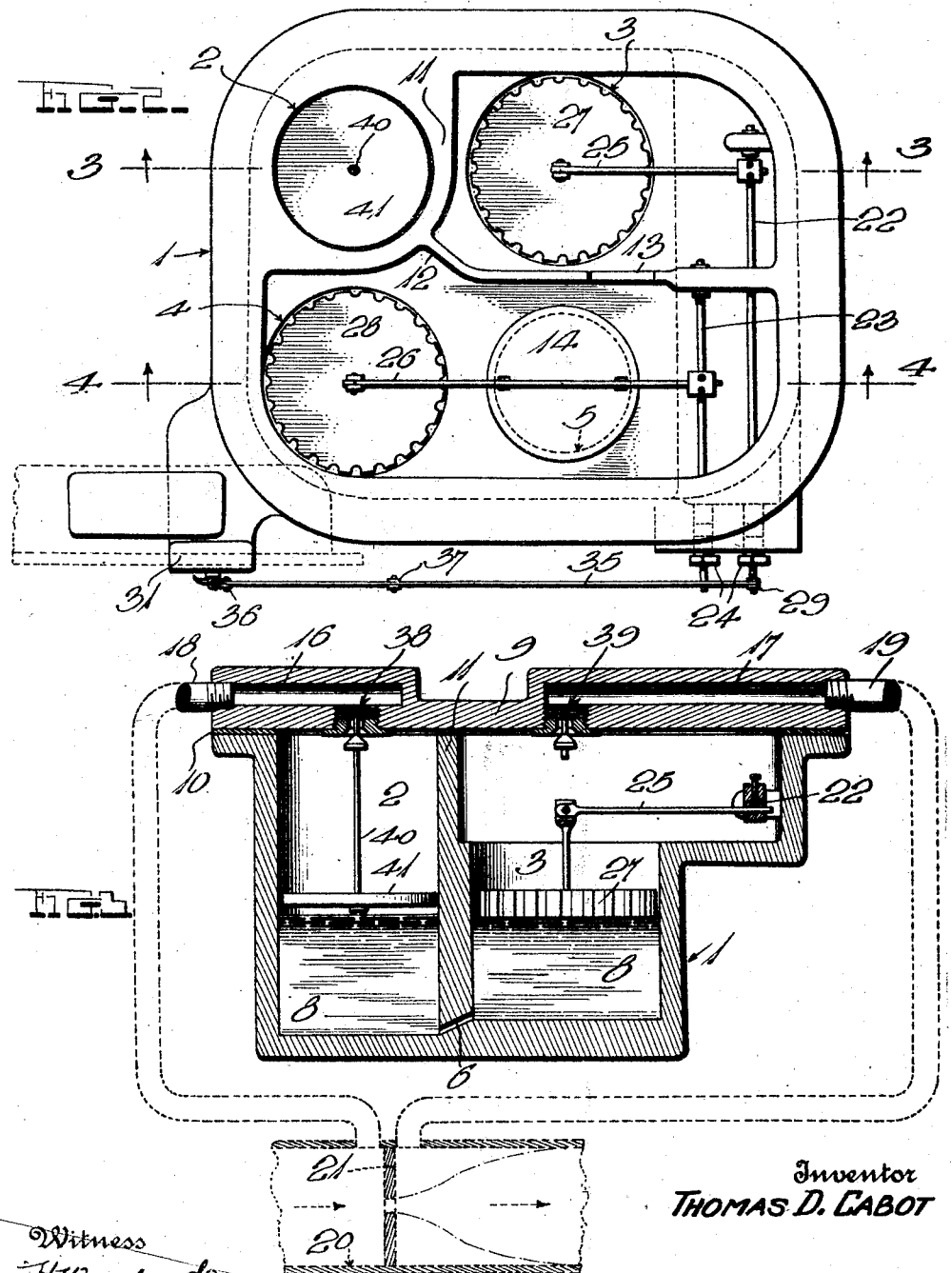

Patented Oct. 13, 1925.

1,556,910

UNITED STATES PATENT OFFICE.

THOMAS D. CABOT, OF BOSTON, MASSACHUSETTS.

ORIFICE OR SIMILAR GAS METER.

Application filed June 21, 1923. Serial No. 646,913.

*To all whom it may concern:*

Be it known that I, THOMAS D. CABOT, a citizen of the United States, residing at Boston, in the county of Suffolk and State of Massachusetts, have invented certain new and useful Improvements in Orifice or Similar Gas Meters; and I do declare the following to be a full, clear, and exact description of the invention, such as will enable others skilled in the art to which it appertains to make and use the same.

This invention relates to gas measuring devices, being an improved orifice meter.

At the present age, the quantity of gas passing through closed pipes for a given period of time is determined by orifice meters, Venturi and Pitot tubes, and other similar gas measuring devices from which differential pressure may be ascertained; and according to the present state of the art such meters are made with a differential pressure recording mechanism recording upon a graduated, clock-operated chart, and an altogether independent static pressure recording mechanism operable upon the same or another graduated, clock-operated chart. From the chart or charts, the average differential pressure and the average static pressure may be determined for a desired period of time, and from these averages, the amount of gas in cubic feet passing through the pipes for the period of time may be determined by solving the following equation:

$$Q = C\sqrt{hP}.$$

In the above specified equation:

Q represents the quantity of gas in cubic feet flowing through the pipe during a given period of time.

C represents a coefficient or constant for the particular meter, this value depending upon certain factors such as the pipe diameter, the orifice diameter, the position of the pressure taps in the pipe with respect to the orifice plate, or the particular arrangement for which the meter is calibrated, the specific gravity of the gas being measured, and the average temperature of the flowing gas.

h represents the average differential pressure for the given period of time.

P represents the average absolute static pressure for the given period of time.

Of course, after the known and ascertained values have been inserted in the above specified equation, the equation may be solved in order to determine the numerical value for the symbol Q, which represents the quantity of gas in cubic feet flowing through the pipe during the given period of time, by the use of specially prepared tables. By the use of certain tables it is easier to solve the equation than it is to solve it by mathematical computation. But even to solve the equation by the use of the tables, much careful computation is necessary, so that it is the desire of those skilled in the art to have a device which will automatically record factors from which the equation may be easily solved without requiring much careful computation. The present invention has been designed in order to produce such a desirable device.

The improved orifice meter forming the subject matter of the present invention does not record the differential and static pressures independently, but instead of this, it automatically records the products of the differential and static pressures. It includes a differential pressure responsive mechanism and a static pressure responsive mechanism, but these mechanisms are coupled together and to the marker arm which operates over a graduated, clock-operated chart in such a manner that the resultant movement of the marker will be directly proportional to the products of the differential and static pressures.

The clock-operated chart over which the marker operates may either be graduated in units representing products of differential and static pressures or in units representing square roots of such products. Where the chart is graduated in the first mentioned units, several readings should be taken of values recorded at different intervals during the period of time for which the quantity of gas passing through the pipe is desired to be known. The square root of each reading must then be computed, and then the average of these square roots must be determined. This value must be multiplied by the constant of the meter, and the product will be the quantity of gas in cubic feet passing through the pipe during the given period of time. Where the chart is graduated in the last mentioned units representing square roots of products of differential and static pressures, the average of several readings taken from it must only be multiplied by the constant of the meter in order for the quantity of gas to be determined.

The principle of Boyle's law is involved in the static pressure movement or mechanism of the device. As is known, one way of stating this law, is as follows:—The volume of a given mass of gas, at a constant temperature, varies inversely as the pressure to which it is subjected.

The novelty in the invention resides in the combination and arrangement of parts and the details of construction, which are hereinafter fully described and claimed, and illustrated in the accompanying drawings.

In the drawings which form a part of this specification:

Figure 1 is a side elevation of a meter constructed in accordance with the principles of the present invention;

Figure 2 is a top plan view of the improved meter with the cover-plate removed; and Figures 3 and 4 are longitudinal sectional views through the meter taken substantially on the planes indicated by the lines 3—3 and 4—4 respectively of Fig. 2, these views like Fig. 2 being drawn to a larger scale than Fig. 1.

In the illustrated embodiment of the invention, the numeral 1 represents a casing which is provided with four wells 2, 3, 4 and 5. The wells 2 and 3 are in communication with each other at their lower ends by means of a passage 6, and the wells 4 and 5 are similarly in communication with each other at their lower ends by means of a similar passage 7. Mercury or other suitable liquid 8 is placed in the wells 2, 3, 4 and 5, so that the wells 2 and 3 and their connecting passage 6 form a substantially U-shaped mercury or liquid column, and the wells 4 and 5 with their connecting passage 7 form a second substantially U-shaped mercury or liquid column.

The casing 1 is provided with a cover 9. This cover 9 is tightly clamped onto the casing 1 so as to be gas-tight, a suitable gasket 10 being interposed between these two members.

A wall 11 surrounds the well 2 and entirely separates the interior of the latter from the wells 3, 4 and 5. A wall 12 extends from the wall 11 to one end of the casing, passing between the wells 3 and 5, but this wall 12 is provided with a passage 13 so that gas may pass from the chamber in which the well 3 is located to the chamber in which the wells 4 and 5 are located. The well 5 is provided with a closure 14. This is gas-tight and provides a gas space 15 in the upper portion of the well 5 above the mercury 8 therein.

The cover 9 of the casing 1 is provided with inlet passages 16 and 17, the passage 16 leading into the upper portion of the well 2, while the passage 17 leads into the upper portion of the chamber in which the well 3 is located. Pipes 18 and 19 lead to the passages 16 and 17 respectively from the upstream and downstream sides respectively of a pipe 20 provided with an orifice plate 21. Thus, upstream pressure is supplied to the well 2, and downstream pressure is supplied to the well 3, and also to the well 4, since the chamber in which the well 4 is disposed is in communication by means of the passage 13 with the chamber in which the well 3 is disposed.

Since upstream pressure is supplied to the well 2 and downstream pressure to the well 3, the substantially U-shaped mercury column formed by these two wells and their connecting passage 6 may be termed a differential pressure mercury column. The downstream pressure which is supplied to the well 4 acts upon the mercury 8 in this well, the passage 7 and the well 5, so as to compress the gas confined in the chamber 15 and to cause the mercury level to indicate the static pressure. The mercury column formed by the wells 4 and 5 and their connecting passage 7 may, therefore, be termed a static pressure mercury column.

Mounted in the casing 1 and extending transversely across one end thereof is a pair of rock-shafts 22 and 23. Both of these rock shafts have one of their ends extending through one of the sides of the casing 1 to the exterior of the casing, stuffing boxes 24 being arranged in said side of the casing to prevent leakage of gas.

On the inside of the casing 1, the rock shafts 22 and 23 are provided with arms 25 and 26 respectively. The free end of the arm 25 is secured to a float 27, which floats upon the mercury 8 contained in the well 3, and the free end of the arm 26 is secured to a float 28 which floats upon the mercury 8 contained in the well 4. The outer ends of the rock shafts 22 and 23 are provided with crank arms 29 and 30 respectively. These crank arms are arranged at right angles to each other, the crank arm 29 extending vertically and the arm 30 extending horizontally. Preferably the arm 30 is of the same length as the float arm 26.

The casing 1 is provided with a bracket 31 upon which is mounted a clock-operated chart 32. This chart 32 is preferably in the form of a rotatable disk and is graduated in the manner hereinafter described. Pivoted upon the bracket 31 so as to swing across the chart 32 is a marker arm 33, the free end of which is provided with a marker element 34 adapted to mark upon the chart 32 as it moves across the same, or as the chart moves.

The numeral 35 represents a link which has a slidable and pivotal connection 36 at one end to the intermediate portion of the marker arm 33. The other end of this link 35 is pivoted to the free end of the crank arm 29 so that a longitudinal movement will be imparted to the link 35 when the crank arm 29 swings. The free end of the crank arm 30 is connected to the intermediate portion of the link 35 by means of a short link 37 so that swinging movement is imparted to the link 35 as the crank arm 30 swings. This swinging movement causes the connection 26 to slide upon the marker arm 33.

The passages 16 and 17 are provided with inwardly opening valves 38 and 39 respectively. Both of these valves are normally open. The valve 38 carries a depending stem 40, to which a float 41 is suspended. This float 41 is normally disposed above the level of the mercury in the well 2. However, when the mercury in this well rises beyond a predetermined amount, it will engage the float 41 and raise the same and cause the valve 38 to close. The valve 39 is positioned directly above the connection between the float 27 and the float arm 25, so as to be engaged by an upwardly projecting portion of this connection and close in case the mercury 8 in the well 3 rises above a predetermined amount.

In assembling the device and connecting it to the pipes 18 and 19 which lead from the gas pipe 20, a sample of the gas supplied by the pipe 20 is placed in the gas space 15 disposed in the upper portion of the well 5. The gas which is placed in the gas space 15 may be under normal atmospheric pressure, or under a predetermined pressure which is approximately the average working pressure in the gas pipe 20, the coefficient being suitably corrected for pressures other than atmospheric, so that the level of the mercury in the well 5 will be the same as the level of the mercury in the well 4 at whatever pressure is predetermined. Thus, normally the surface of the mercury in the well 5 lies a certain distance below the lower side of the cover or closure 14. The pivot 42 of the marker arm 33 should be located so that normally it will lie the same distance below the center of the connection 36.

Where the gas in the gas space 15 should be not far from atmospheric pressure, it will be sufficient for practical purposes, to fill the gas space 15 with the gas under atmospheric pressure, which can be accomplished by screwing on the cover 14 in an atmosphere of the gas. Where, however, the gas pressure is much higher than atmospheric pressure, the cover 14 may be screwed on with the device in a chamber containing a sample of the gas under the higher pressure, or else gas under atmospheric pressure may be entrapped in the gas space 15 as previously described and then brought to the proper pressure by pouring more mercury into the well 4.

When gas is passing through the gas pipe 20 and through the orifice in the orifice pipe 21, the gas will be under uneven pressure on opposite sides of the orifice plate 21. The upstream pressure will be exerted upon the mercury in the well 2 and the downstream pressure will be exerted upon the mercury in the wells 3 and 4. The downstream pressure exerted upon the mercury in the well 3 will be less than the upstream pressure exerted upon the mercury in the well 2 so that mercury from the well 2 will pass through the passage 6 into the well 3, and the float 27 will be raised. This movement of the float 27 will swing the float arm 25, rock the rock shaft 22 and swing the crank arm 29. At the same time, the gas pressure upon the mercury in the well 4 will overbalance the pressure of the gas contained in the gas chamber 15 of the well, so that mercury from the well 4 will pass through the passage 7 into the well 5. The float 28 will therefore be lowered, and in lowering it will swing the float arm 26, rock the rock shaft 23 and swing the crank arm 30. Movement of the crank arm 29 will move the link 35 longitudinally, and movement of the crank arm 30 will, through the medium of the link 37, move the link 35 transversely. The connection 36 will therefore slide upon the marker arm 33 and the marker arm will be swung transversely across the chart 32.

The purpose of having the marker arm 33 moved by the combined movements of the crank arms 29 and 30, or in fact the floats 27 and 28, is to cause the marking element 34 carried at the free end of the marker arm to move across the chart a distance approximately in proportion to the product of the differential pressure and static pressure maintained in the gas pipe 20. It of course will be readily seen that the float 27 rises in direct proportion to the differences between the upstream pressure and the downstream pressure, and that the crank arm 29 swings in direct proportion to this differential pressure. Thus, if the connection 36 did not slide upon the marker arm 33, the latter would swing in direct proportion to the differential pressure. However, the connection 36 does slide upon the marker arm 33, and the amount of its movement with respect to the pivot 42 is inversely proportional to the static pressure. This will be readily understood when it is remembered that the arms 26 and 30, and links 37 and 35 are of such lengths and are connected together at such points that the distance between the pivot 42 of the marker arm 33 and the center of the connection 36 will always be maintained approximately equal to the distance of the surface of the mercury 8 in the well 5 from the lowest side of the closure 14 of said well. These distances being maintained the same, it is easy to understand how the connection 36 slides upon the marker arm 32 in inverse proportion to the static pressure, because according to Boyle's law, the volume of a given mass of gas, at a constant temperature, is inversely as the pressure to which it is subjected. Thus, as the gas pressure upon the mercury in the well 4 exceeds the pressure of the gas in the gas chamber 15, the volume of the gas in the latter will be decreased in proportion to the difference in pressure, and since the float 28 will drop in proportion to the decrease in volume of the gas in the chamber 15, the connection 36 will be lowered upon the marker arm 33 in proportion to the changes in the static pressure.

In order for the device to operate in this manner, the areas of the wells 4 and 5 must bear the same ratio as the length of the link 35 is to the float arm 26 or the crank arm 30 and the rock arms must be very close.

Since when gas is flowing through the pipe 20, the connection 36 will be moved to the right by the differential pressure responsive mechanism approximately in direct proportion to the differential pressure, and at the same time will be moved downwardly by the static pressure responsive mechanism approximately in proportion to the static pressure, the resultant movement of the marker element 34 carried by the marker arm 33 will be approximately equal to the product of the differential and static pressures. If, therefore, the chart 32 is graduated in units to correspond with such products, the average product for a given length of time may be ascertained from several readings. The square root of this average must then be determined and this value must be multiplied by the constant of the meter. The result will then be the quantity of gas in cubic feet which flowed through the pipe during the given period of time. If, however, the chart is graduated in a well known manner, in units representing square roots of units which are the products of differential and static pressures, the square roots of products of differential and static pressures for several intervals during a given period of time may be read directly from the chart. The average of these readings must then be determined and this average must be multiplied by the constant of the meter in order to determine the quantity of gas.

The connection 36 may carry a pointer 43 operable over a scale 44 arranged upon the bracket 31, so that if desired, the static pressure alone may be ascertained.

From the foregoing description, taken in connection with the accompanying drawings, the construction, use, operation and advantages of the invention will be readily understood.

It is apparent that various changes in form, proportion, and in various details of construction may be made without departing from the spirit and principle of the invention, or sacrificing any of the advantages thereof; and hence it is to be understood that such changes may be made within the scope of the appended claims.

What is claimed is:

1. In a meter of the class described, the combination of a graduated clock-operated chart; an arm pivoted at one end and carrying a marking element at its other end to mark upon said chart; a differential pressure responsive mechanism movable proportionately to the differential pressure of the gas in a pipe line, a static pressure responsive mechanism movable proportionately to the static pressure of the gas in the pipe line; a link pivoted at one end to said differential mechanism and connected intermediate of its ends to the other mechanism, whereby it is moved longitudinally by one mechanism and swung transversely by the other mechanism, and a slidable and pivotal connection between the other end of said link and said arm, whereby the latter is swung so as to cause said marking element to move over said chart proportionately to the product of the differential and static pressures.

2. In an orifice or similar gas meter, the combination with a graduated, clock-operated chart; and a marker operable over said chart; of means forming a pair of substantially U-shaped liquid columns, means for supplying downstream pressure to one leg of each column, means for supplying upstream pressure to the other leg of one column, a closure for the other leg of the other column, floats mounted in the first mentioned legs of said columns, and means for imparting the movement of said floats to said marker for moving the latter over said chart proportionately to the product of the differential and static pressures.

3. In an orifice or similar gas meter, the combination with a graduated, clock-operated chart; and a marker operable over said chart; of means forming a substantially U-shaped differential pressure liquid column and a substantially U-shaped static pressure liquid column, floats mounted in and means for supplying downstream pressure to one of the legs of said columns, means for supplying upstream pressure to the other leg of said differential pressure column; a closure providing a gas chamber at the upper portion of the other leg of said static pressure column, a link slidably and pivotally connected to said marker; and means for connecting said floats to said link in such a way that the resultant movement will move said marker across said chart proportionately to the product of the differential and static pressures.

4. In an orifice or similar gas meter, the combination with a graduated, clock-operated chart, and a marker arm pivoted at one end to swing across said chart and carrying a marker at the other end to mark upon said chart; of a casing provided with a substantially U-shaped differential pressure liquid column and a substantially U-shaped static pressure liquid column, floats mounted in and means for supplying downstream pressure to one of the legs of each of said columns, means for supplying upstream pressure to the other leg of said differential pressure column, a closure providing a gas chamber at the upper portion of the other leg of said static pressure column, rock shafts mounted in said casing, float arms carried by said rock shafts and connected to said floats, crank arms carried by said rock shafts and being arranged at right angles to each other, a link slidably and pivotally connected at one end to said marker arm and pivotally connected at its other end to one of said crank arms, and a link connecting the other crank arm with the intermediate portion of the first named link whereby the resultant movement imparted to the latter will swing said marker arm across said chart to cause said marker to move proportionately to the product of the differential and static pressures.

In testimony whereof I have hereunto affixed my signature.

THOMAS D. CABOT.